United States Patent Office 2,977,155
Patented Mar. 28, 1961

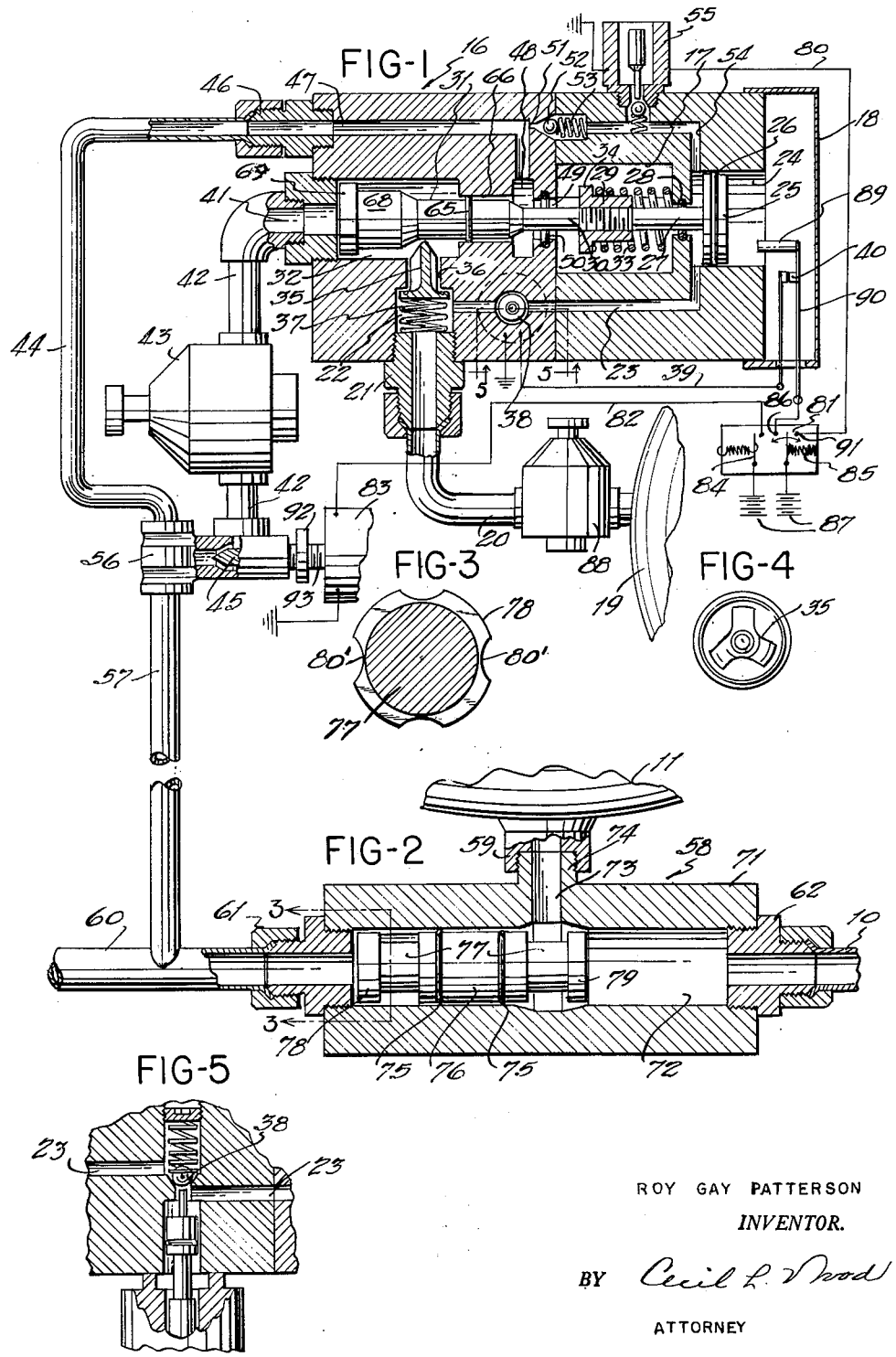

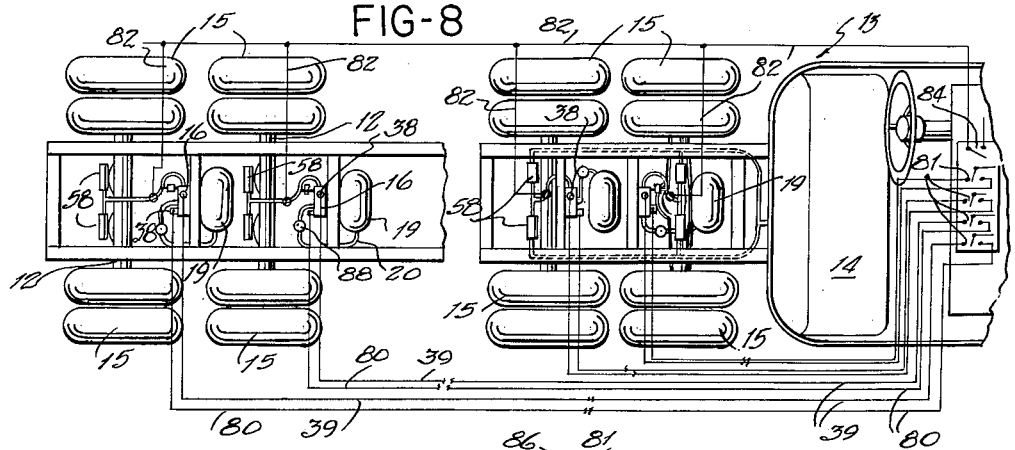

2,977,155

AIR BRAKE SAFETY CONTROL FOR VEHICLES

Roy Gay Patterson, 2604 May St., Fort Worth, Tex.

Filed Aug. 15, 1956, Ser. No. 604,173

8 Claims. (Cl. 303—2)

This invention relates to braking systems for motor vehicles, of the type used for carrying heavy loads, such as the usually heavy tractor-trailer combinations traveling along highways, and its particular reference to an emergency or auxiliary control system for conventional air brake mechanisms which are best suited for such heavy equipment, as evidenced by long use in railway equipment.

The principal object of the invention resides in the provision of a control unit adapted to be connected in the conventional system by which additional operative insurance is afforded, and by which instantaneous action can be accomplished in situations where it is desirable or necessary to slow or stop the vehicle to prevent serious accident, as on steep grades in roadways or in heavy traffic, and where immediate action is required, and affording a predetermined time lapse before the brakes are fully applied.

Another object of the invention is that of providing a simple and inexpensive auxiliary control device which can be applied to the conventional truck having the usual air brake system, and with a minimum of expense and time, whereby the conventional system can be augmented to adequately insure braking facilities when required in emergencies.

A further object of the invention resides in the provision of an auxiliary braking system capable of operation through an auxiliary pressure tank carried by the vehicle, and connected into the primary system, in which compressed air, or other compressible gases, can be stored under pressure, and controlled by electrically actuated valves operated by switches conveniently located in the cab of the vehicle in easy access to the operator whereby it is made possible to effect instantaneous action in slowing or stopping the vehicle by the operation of electrical circuits.

An object of the invention is to provide a safety device which can be brought into operation instantaneously in the event of the failure of the regular braking system of the vehicle to substitute therefor, but is incapable of interfering with the normal function of such system, providing a selective positive action on the brakes of any axle of the vehicle, independently of the others, and affording a plurality of braking actions without dependence upon the conventional air pressure storage of the regular braking system.

A still further object of the invention resides in the provision of an independent emergency braking system for any type of multi-axle vehicle having air-actuated brakes, and capable of being adjusted to any desired "time-lag" for slowing or stopping the vehicle, or for instantaneous stops when desired, and is adapted for operation in a wide variety of temperature ranges.

An important object of the device is its adaptation for substituting for the regular air brake system when any portion thereof becomes inoperative or impotent, such as in the event any of the air lines of the system is broken.

An object of the invention is that of providing an auxiliary braking system by which such malfunctions of the regular air brake system occurs as when the brake linings become glazed requiring relatively high braking pressures to cause these elements to properly engage the brake drums to stop the vehicle.

Broadly, the invention contemplates the provision of an automatic air brake control system for motor vehicles which is actuated by electrical switches in easy access to the operator, and affording a system which employs a minimum of piping and is capable of being connected into the ordinary system embodied in the brake units of conventional design, and without modifying the original system in any material manner.

While the foregoing objects are paramount, other and lesser objects will become manifest as the description proceeds, taken in connection with the appended drawings wherein:

Figure 1 illustrates, in longitudinal section, and in schematic relation, an actuating unit embodying the principles of the invention, showing the pressure-actuated valves and pressure regulators.

Figure 2 illustrates, in longitudinal section, the transfer valve and piston, embodying the invention, shown connected to a wheel brake unit, the latter being shown fragmentarily.

Figure 3 is a sectional view, on lines 3—3 of Figure 2, showing the peripheral recesses in the piston member of the transfer valve.

Figure 4 illustrates the inner end of the check valve actuated by the piston operating the main unit shown in Figure 1.

Figure 5 fragmentarily illustrates, in section on lines 5—5 of Figure 1, the solenoid actuated valve controling the lower air passage illustrated in Figure 1.

Figure 6 is a side elevational view of the valve element in the main actuating unit shown in Figure 1.

Figure 7 is an end view of the piston element shown in Figure 6.

Figure 8 is a schematic plan view of a truck and trailer chassis illustrating the air control units and conduits and the electrical conductors by which the same are actuated, and Figure 9 is an enlarged schematic plan view of a truck or trailer chassis showing the control unit, the individual wheel brake units, the auxiliary air tank, the air and electrical conduits for the auxiliary system and switches therefor.

The emergency actuating system herein described is connected into the air brake system originally installed on the vehicle at wheel brake units and therefore uses no part of the air conduits already present for conducting the compressed fluids to the wheel brake units.

The conventional air brake systems comprise, in connection with a main compressed air reservoir (not shown), certain air conduits 10 which are connected through a diaphragm-actuated brake unit 11 attached to an axle 12 of the vehicle 13, as illustrated schematically in Figures 7 and 8. The air conduits 10 are connected through control valves (also not shown) in the vehicle cab 14 which are accessible to the vehicle operator. A brake unit 11 is provided for each wheel 15 of the vehicle and is usually located on the axle 12 near the wheel 15 whose brake is to be controlled.

The invention comprises a control device which consists primarily of a body 16 having a plurality of cylinders, recesses and passages formed therein which will be described in detail. The body 16 may be of any desired form in transverse section, and is indicated here as having flat sides and edges, defining a rectangular form, and having a transverse opening 17 through its lesser diameter near one end, as shown in Figures 1 and 8, and a closure or dust cover 18 enclosing one end and forming a housing for part of the mechanism.

An auxiliary tank or reservoir 19 is provided which is adapted to contain compressed air, or other compressible fluids, such as $CO_2$, or the like, and a conduit 20 connects the tank 19 to the unit body 16 through a coupling 21 and communicates with a flow chamber 22 which in turn is connected to a passage 23 extending longitudinally of the body 16 and communicates with a cylindrical chamber 24 which is enclosed by the cover 18, as shown in Figure 1.

A piston 25 is arranged in the chamber 24, properly sealed by sealing ring 26, and has a rod 27 thereon which extends into the opening 17 in the body 16, a sealing ring 28 being provided on the rod 27 to prevent leakage of compressed air thereby. The outer end of the piston rod 27 is threaded into a flanged coupling 29 which is threaded on the stem 30 of a valve element 31 operating in a cylindrical chamber 32 in the body 16, opposite the chamber 24, and is adapted to move longitudinally of the body 16, with the piston 25, to change the air flow therethrough, as will presently become manifest. The valve element 31 is shown in detail Figures 6 and 7. A compression spring 33 is arranged about the coupling 29 and the piston rod 27, bearing against the flange 34 of the latter, to retain the piston 25 and the valve element 31 in their normally inoperative positions shown in Figure 1.

In the chamber 22 is arranged a check valve 35, which is shown in plan view in Figure 4, normally closing the outlet 36 between the chambers 22 and 32, a compression spring 37 bearing against the check valve 35. A solenoid check valve 38 is arranged in the passage 23, which is offset at this point, as illustrated in Figure 5, to open the passage 23 to the flow of compressed air, when desired, to influence the piston 25 and the elements attached thereto. Such operation will be later described. The solenoid valve 38 is connected into an electrical circuit 39 controlled by a normally closed switch 40 therein which is adapted to be opened by the piston 25.

The valve element 31 operating in the chamber 32 controls the flow of air out of the latter through an opening 41 which has a conduit 42 connected thereto and in which a regulator 43 is connected, as shown in Figure 1. The conduit 42 communicates with a conduit 44 through a solenoid actuated needle valve 45, which is adjustable, and the conduit 44 is connected through a coupling 46 to an air passage 47 in the body 16 which terminates in an annular chamber 48, formed in the body 16 between the chamber 32 and the opening 17 through the body 16, an opening 49 having a gasket 50 peripherally thereof, concentrically encircles the stem 30 of the valve element 31.

Near the end of the passage 47 is a relatively small orifice 51 behind which a ball check valve 52 is normally seated under the tension of a spring 53. Connecting the orifice 51 and the piston chamber 24 is a passage 54 and the latter communicates with the chamber 24 on the opposite side thereof from the passage 23 previously described. Air flowing through both of the passages 23 and 54 will influence the piston 25 as will be made manifest. A solenoid-actuated check valve 55 is arranged in the passage 54 by which the pressure therein can be reduced when desired.

Connected to the conduit 44, through a coupling 56, is a conduit 57 which is connected to the transfer valve 58, one of which is connected to each of the brake units 11 through a coupling 59, shown fragmentarily in Figure 2 with a transfer valve 58 connected thereto. The transfer valve units 58 are connected by a conduit 60, which is connected to the conduit 57, and the former is connected to the transfer valve unit 58 by a coupling 61, as depicted in Figure 2. The conduits 10 of the conventional air brake system of the vehicle are connected to the ends of the transfer valve units 58 by couplings 62 opposite the conduits 60. This arrangement is shown in Figure 9 in which the association of the emergency system here described is illustrated.

The valve element 31, operating in the chamber 32 in the body 16 is shown in greater detail in Figures 6 and 7. The main body 63 of the member 31 is cylindrical and has a circumferential groove 64 thereon to receive an O-ring or suitable gasket 65 by which to afford a seal within the passage 66 which forms a communication between the chamber 32 and the annular chamber 48, as shown in Figure 1. The stem 30 is an integral part of the body 63 and a tapered shoulder 67 is defined between the body 63 and the stem 30. An enlarged cylindrical portion 68 is formed on the body 63 opposite the stem 30 and has a discular head member 69 thereon which has a series of ports 70 formed near its perimeter, as shown in Figure 7, the purpose of which will become apparent.

The transfer valve unit 58 comprises a cylindrical body 71 having a central bore 72 therein open at each end to receive the threaded couplings 61 and 62, as indicated in Figure 2. Intermediate the ends of the body 71 is a port 73 having a boss 74 by which the brake unit 11 is threadedly attached. The central bore 72 is slightly enlarged at the inner end of the port 73 and at both sides of the latter the surfaces are inclined or conical to provide a suitable transfer surface for the sealing members 75 on the piston element 76 operating in the bore 72 by which the operating air pressures are controlled between the emergency system and the common brake system.

The piston element 76 of the transfer valve 58 has a diametrically reduced portion 77 on each end and these are formed with discular heads 78 and 79 and having arcuate indentations or recesses 80' formed peripherally thereof, as shown in Figure 3. The piston element 76 is designed to travel longitudinally of the bore 72 and automatically operates to control either inlet conduit 10 or 60 by the operation of the unitary control device illustrated in Figure 1, or by the operation of the regular brakes.

As previously stated, and as illustrated schematically in Figure 8, the unit here described is to be applied to each set of wheels 15, with a separate auxiliary tank 19 for each unit although it is possible, and sometimes desirable, to provide a single tank 19 to serve the several installations. The emergency feature of the invention, however, would for practical reasons, be better served by an individual tank or reservoir 19 for each unit. It is to be understood that the invention is not to be limited to any special arrangement with regard to storage of compressed fluids for its practical operation.

It is to be noted also that a separate electrical circuit, with suitable switches, is provided for the operation of each individual axle unit. These circuits and switches are best illustrated in Figures 8 and 9, and comprise electrical conductors 39, for operating the solenoid valves 38, the conductors 80' for actuating the solenoid valves 55 through a two-pole switch 81, and the conductors 82 operating the solenoid 83 which controls the valve 45 through a switch 84. All of the switches are located on the instrument panel of the truck 13, as indicated in Figure 8.

It is repeated that the invention is intended only as an emergency braking system to be actuated only when the regular braking system is impotent or incapable of slowing or stopping the vehicle when an emergency occurs, as in the execution of relatively steep grades, or in heavy traffic with heavy loads. The common system will always suffice when the conditions are normal and in such operation the invention need not be brought into action. However, in operation, the invention can be actuated by actuating the valve 38, and this is accomplished by operating the switch 81 to engage the terminal 86 of the latter so that current from the source 87 can flow through the conductor 39 to open the solenoid valve 38 to admit air pressure from the tank 19 through the regulator 88 and the conduit 20 and passage 23 to the chamber 24 behind the piston 25 to move the latter therein.

As the piston 25 is moved toward the outer end of the chamber 24, and engages the arm 89 on the leg 90 of the switch 40 the circuit is broken, but when this occurs the pressure in the chamber 24 has reached the necessary volume to retain the piston 25 in its advanced position which will also place the element 31 in a position to close the opening 49 and open the valve 35 against the tension of the spring 37 to admit the air flow into the chamber 32 and to conduit 42 where it flows through the regulator 43 past the valve 45 and thence through the conduits 57 and 60 into the transfer valve 58 to move the piston element 76 to admit the air flow to the brake units 11, the fluid passing through the ports 70 in the member 69 to operate the brakes.

Meanwhile a low pressure flow of the compressed air moves through the conduit 44, passage 47, and the orifice 51, past the ball check valve 52 and through the passage 54 to the chamber 24 to further retain the piston 25 in extended position to maintain the switch 40 open to prevent the solenoid valve 38 from functioning as long as the pressures in the device are maintained. It will be noted that the switch 81 is spring loaded, by the spring 85, whereby continuous pressure in one direction on the switch lever is necessary to keep it closed while in the opposite direction, as will be shown, the switch is actuated manually in a normal manner. The spring 85 is provided to prevent the switch from being permitted to remain closed insofar as the circuit 80', operating the solenoid valve 55, is concerned. The other side of the switch 86 can be operated to close the circuit 39 to the solenoid valve 38.

When proper braking control is accomplished in the manner just described, the mechanism can be returned to its inoperative position by bleeding off the pressure in the system through the solenoid valve 55 when the switch 81 is operated to the opposite pole 91 against the tension of the spring 85. The discharge volume of the solenoid valve 55 is several times greater than the inlet volume of the orifice 51 providing for the accelerated retraction of the piston 25 to its normal inoperative position and to shut off the air flow from the auxiliary tank 19. When the member 31 returns to its position shown in Figure 1 the valve 35 is closed and the opening 49 is opened to permit the air to be discharged to the atmosphere through the opening 17 to release the brakes. The piston element 76 of the transfer valve 58 will remain in its extended position, however, until the regular air brakes are applied whereupon it moves back to the position shown in Figure 2.

The regulators 43 and 88 are of conventional type and are provided to control the generally high pressures required in the conduits to actuate the brakes several times without replenishing the supply. The capacity of the auxiliary reservoir 19 may be as desired in accordance with the braking requirements of the vehicle.

The needle valve 45, shown in Figure 1, operated by a solenoid 83, is employed for accelerating the movement of air through the conduits 42, 57 and 60 to the brake units 11 for a quick stop. This valve is set for ordinary actuation of the system and is adjusted by a setting disk 92 threaded on the stem 93 of the solenoid 83 so that when the switch 84 is closed, which is also spring loaded to normally retain the same open, the circuit 82 is energized to operate the solenoid 83 to open the valve 45 above its normal flow capacity thus providing sudden increased air volume when desired for an emergency quick stop. This feature, however, is to be employed only under abnormal circumstances.

Manifestly, the structure and arrangement of parts, herein shown and described, are capable of certain changes and modifications from time to time, by persons skilled in the art, without departing from the spirit and intent of the invention or the scope of the appended claims.

What is claimed is:

1. In an emergency air brake system for motor vehicles having a common multi-axle braking system, an independent auxiliary pressure tank connected into said system, a valve unit controlling air flow from said pressure tank, an electrical circuit actuated by said valve unit for controlling the same, electrical means for actuating said valve unit, and a transfer valve connected to each wheel unit of said vehicle operated by said valve unit whereby to control air flow to the brake unit thereof.

2. In an emergency device for actuating the air brakes on a motor vehicle having an air-actuated braking system embodying wheel brake units, an auxiliary air tank having a pressure charge capable of stopping said vehicle, a primary air actuated valve for controlling pressures from said tank admitted to the brakes of said vehicle, an electrically actuated valve unit controlling said air-actuated valve by electrical switches in the cab of said vehicle, air-actuated transfer valve means for admitting air to the braking units of said vehicle, and electrical means for releasing said brakes.

3. In apparatus of the type described, a valve unit comprising a body, a cylindrical chamber in one end of the body, a piston reciprocable in the chamber, a valve chamber in the opposite end of the body aligned with the first mentioned chamber, and having an outlet in its outer end, a side inlet in said valve chamber near said outlet, a spring biased check valve normally closing the inlet and having a portion extending into the valve chamber, an elongated valve element reciprocable in the valve chamber and having a shoulder thereon for engagement with the said check valve to unseat the same, a spring biased piston rod connected at one end to the piston and acting thereon to urge the same inwardly relative to the first mentioned chamber, a valve stem connecting the valve element to the opposite end of the piston rod whereby the valve element is movable longitudinally in response to the action of the piston, a fluid passage in the body communicating at one end with the inlet exteriorly of the check valve and at its opposite end with the first mentioned chamber inwardly of the piston, and a solenoid operable valve in the fluid passage whereby the piston is urged outwardly in the chamber, and the check valve is opened, by fluid pressure upon energizing the solenoid.

4. In a valve unit as described in claim 3, an electrical circuit including a normally closed switch connected in series with the solenoid and capable of being acted upon by the piston to open it upon movement of the piston outwardly in the chamber, conduits connected to the inlet and outlet, and a restricted fluid passage in the body, normally closed by a check valve, communicating with the outlet conduit and with the first mentioned chamber inwardly of the piston whereby the piston is urged outwardly in the chamber by fluid pressure upon deenergizing the solenoid.

5. In a valve unit as described in claim 3, conduits connected to the inlet and outlet, a restricted fluid passage in the body, normally closed by a check valve, communicating with the outlet conduit, and a solenoid operable pressure release valve in fluid communication with the restricted fluid passage downstream relative to the check valve, the opening through the pressure release valve being larger than the opening through the check valve.

6. In a valve unit as described in claim 3, conduits connected to the inlet and outlet, an adjustable valve in the outlet conduit, and a solenoid acting on the adjustable valve to increase the size of the opening through it.

7. In a valve unit as described in claim 3, conduits connected to the inlet and outlet, a fluid passage in the body communicating with the outlet conduit, an annular cavity in the body surrounding the valve stem and in fluid communication with the fluid passage, a fluid passage surrounding the valve stem and communicating at one end with the annular cavity, and a port in the body communicating with the opposite end of the last mentioned passage and discharging to the atmosphere, the arrangement being such that the last mentioned passage is closed upon movement of the valve element in one direction and opened upon movement of the valve element in the opposite direction whereby pressure is discharged from the system to the atmosphere.

8. In a common air brake system for multi-axle motor vehicles having individual paired brake units, an emergency system connected into said air brake system and capable of operation independently thereof, comprising, an auxiliary air tank for each axle of said vehicle and air conduits connecting said tank with the brake unit on its corresponding axle, adjustable valves in said air conduits being normally set to control the supply of air to the brake units whereby the latter are fully applied when the common brake system is inoperative, and electrically operable means acting upon the respective adjustable valves to substantially increase the supply of air to the brake units whereby to accelerate the application of the brakes.

References Cited in the file of this patent

UNITED STATES PATENTS

| | | |
|---|---|---|
| 926,389 | Collin | June 29, 1909 |
| 2,057,707 | Carroll | Oct. 20, 1936 |
| 2,240,166 | Stanley | Apr. 29, 1941 |
| 2,781,870 | Clements | Feb. 19, 1957 |
| 2,862,583 | Granche | Dec. 2, 1958 |